Patented June 9, 1931

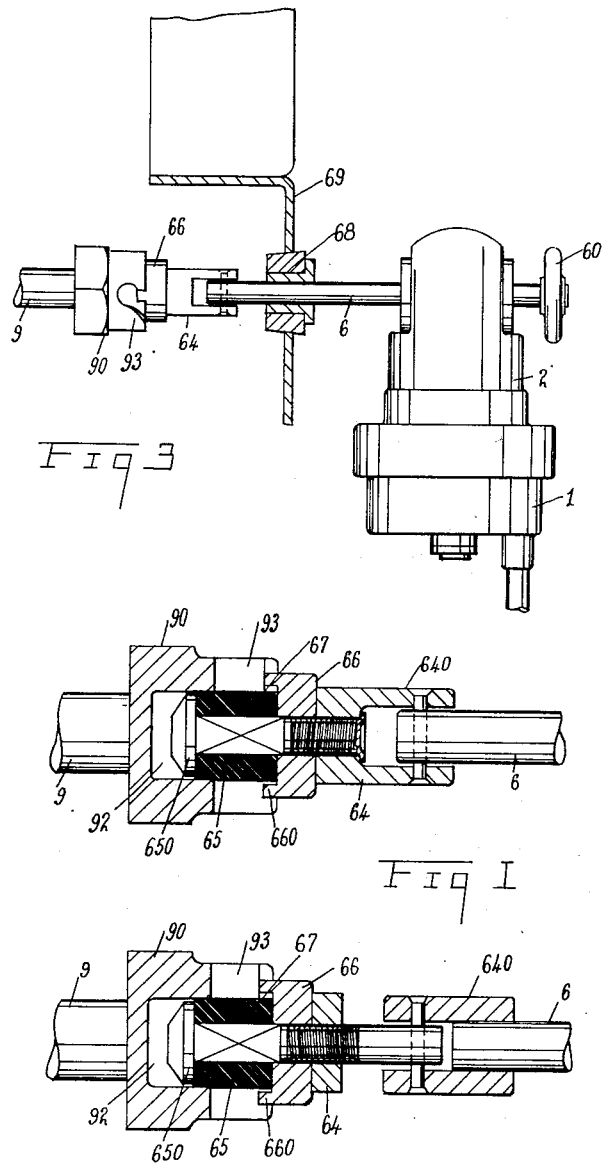

1,809,085

UNITED STATES PATENT OFFICE

HENRY H. VAUGHAN, OF MONTREAL, QUEBEC, AND WILLIAM G. CUMMING, OF WESTMOUNT, QUEBEC, CANADA

SHAFT COUPLING

Application filed February 25, 1929. Serial No. 342,599.

This invention relates to shaft couplings and particularly to those in which an easily attachable flexible coupling is required.

The object of the invention is to provide a flexible coupling of simple and economical construction that can be operated rapidly and readily to engage with or to release from a power shaft, such as the cranking end of an automobile drive shaft.

A further object is to provide a shaft coupling which can be engaged or released in an otherwise inaccessible position.

Reference is made to the accompanying drawings in which:—

Figures 1 and 2 show form of the coupling.

Figure 3 shows it coupling an air compressor to an automobile drive shaft.

The drive shaft 9, which in Figure 3, represents the drive shaft of an automobile, terminates in a cupped end 90, the cupped portion 92 is usually slotted at 93 to provide a bayonet grip with the hand crank.

The driven shaft 6 has the extension shaft 65 preferably jointed to it by means of the slotted sleeve 640 which forms an extension from the nut 64, which is screwed on the end of the shaft 65. The end of the extension shaft 65 is pressed over within the slotted sleeve 640 to prevent unscrewing of the nut 64. The extension shaft 65 has an end flange 650 and a squared portion adjacent thereto.

Non-rotatably mounted on the squared portion of the shaft 65 adjacent the end flange 650 is a rubber plug 67, and the washer 66. The washer 66 has lugs 660 adapted to enter the slots 93 of the cupped end 90 of the driving shaft 9. A hand grip 60 is mounted on the end of the driven shaft 6.

In Figure 2 the nut 64 is shown separate from the sleeve 640, the sleeve 640 directly coupling the shafts 6 and 65. The nut 64 being in the form of a wing nut for hand screwing on the shaft 65.

A bearing plug 68 is mounted on the shaft 6, to be inserted in the crank aperture of the automobile frame 69.

In operation the shaft 6 with its end coupling is inserted in the cupped portion 92 of the shaft 9, the rubber plug 67 being normally a sliding fit in the cupped portion 92, and the lugs 660 of the washer 66 enter the slots 93.

In rotation of the shaft 6 by means of the hand grip 60, while the washer 66 and the shaft 65 are held from rotation in the cupped end 90, the nut 64 is screwed on the shaft 65, compressing the rubber plug 67 between the end flange 650 and the washer 66 and expanding it radially to grip the inner surface of the cupped portion 92.

In Figure 1, the threading of the extension shaft 65 is the reverse of the rotation of the power shaft 9, whereby on the rotation of the shaft 9 continuous screw pressure is exerted on the rubber plug 67 thereby ensuring its continuous frictional grip in the cupped portion 92 and a steady drive on the shaft 6.

What we claim is:—

1. In a shaft coupling, the combination of a drive shaft, a cupped end thereto, with a driven shaft, a resilient sleeve mounted at its end adapted to enter the cupped end, and means to compress the sleeve axially, in coupling.

2. In a shaft coupling, the combination of a drive shaft, a cupped end thereto, with a driven shaft, a flexible extension thereto, a resilient sleeve mounted at its end adapted to enter the cupped end, and means to compress the sleeve axially, in coupling.

3. In a shaft coupling, the combination of a drive shaft, a centrally cupped end thereto, with a driven shaft having a rubber plug adapted to enter the cupped end, mounted on its end, and means to compress the plug axially, in coupling.

4. In a shaft coupling, the combination of a drive shaft, a centrally cupped end thereto, with a driven shaft having a flanged end, a rubber sleeve mounted thereon within the flange, adapted to enter the cupped end, and means to compress the sleeve axially towards the flange, in coupling.

5. In a shaft coupling, the combination of a drive shaft, a centrally cupped end thereto, with a driven shaft having a flanged end, a rubber sleeve nonrotatably mounted thereon within the flange, adapted to enter the cupped end, and means to compress the sleeve axially towards the flange, in coupling.

6. In a shaft coupling, the combination of a drive shaft, a slotted cupped end thereto, with a driven shaft having a nut connected to its end, an intermediate shaft threaded in said nut, having a flanged end, a loose washer with lugs mounted thereon in contact with the drive shaft slots, and a rubber sleeve mounted thereon between the washer and the flanged end.

7. In a shaft coupling, the combination of a drive shaft, a slotted cupped end thereto, with a driven shaft having a nut flexibly connected to its end, an intermediate shaft threaded in said nut, having a flanged end, a loose washer with lugs nonrotatably mounted thereon in contact with the drive shaft slots, and a non-rotatable rubber sleeve mounted thereon between the washer and the flanged end.

8. In a shaft coupling, the combination of a drive shaft, a slotted cupped end thereto, with a driven shaft, a flanged end thereto, a nut threaded thereon, a washer with lugs in contact with the drive shaft end, a rubber sleeve mounted between the washer and the flanged end.

9. In a shaft coupling, the combination of a drive shaft, a slotted cupped end thereto, with a driven shaft, a flanged end thereto, a nut threaded thereon, a washer with lugs in contact with the drive shaft end, and a rubber sleeve non-rotatably mounted between the washer and the flanged end.

HENRY H. VAUGHAN.
WILLIAM G. CUMMING.